US008494789B2

(12) United States Patent
Boissonneau et al.

(10) Patent No.: US 8,494,789 B2
(45) Date of Patent: Jul. 23, 2013

(54) METHOD FOR MONITORING THE STATUS OF AN ENERGY RESERVE ACCUMULATOR, PARTICULARLY FOR AN AIRCRAFT

(75) Inventors: Patrick Boissonneau, Fonsorbes (FR); Stephan Montillaud, Toulouse (FR)

(73) Assignee: Airbus Operations S.A.S., Toulouse (FR)

( * ) Notice: Subject to any disclaimer, the term of this patent is extended or adjusted under 35 U.S.C. 154(b) by 350 days.

(21) Appl. No.: 12/989,099

(22) PCT Filed: Apr. 10, 2009

(86) PCT No.: PCT/FR2009/000419
§ 371 (c)(1),
(2), (4) Date: Oct. 22, 2010

(87) PCT Pub. No.: WO2009/133298
PCT Pub. Date: Nov. 5, 2009

(65) Prior Publication Data

US 2011/0046901 A1 Feb. 24, 2011

(30) Foreign Application Priority Data

Apr. 25, 2008 (FR) ..................................... 08 52826

(51) Int. Cl.
*G06F 15/00* (2006.01)

(52) U.S. Cl.
USPC ............. 702/50; 702/176; 702/138; 700/204; 700/282; 700/301; 73/37; 73/1.17; 303/122.09; 303/122.12

(58) Field of Classification Search
USPC .................. 702/94, 97, 50, 138, 96, 98, 149, 702/176; 700/204, 282, 301, 304, 197, 200, 700/203; 303/122.09, 122.12; 73/37, 1.17
See application file for complete search history.

(56) References Cited

U.S. PATENT DOCUMENTS 5,221,125 A 6/1993 Okochi et al.
6,132,012 A * 10/2000 Ishii ......................... 303/122.12

(Continued)

FOREIGN PATENT DOCUMENTS

| | | |
|---|---|---|
| CN | 1403697 A | 3/2003 |
| FR | 2 888 898 | 1/2007 |
| JP | 7 033002 | 2/1995 |
| JP | 3390949 B2 | 3/2003 |

OTHER PUBLICATIONS

International Search Report issued Nov. 24, 2009 in PCT/FR09/000419 filed Apr. 10, 2009.

(Continued)

*Primary Examiner* — Carol Tsai
(74) *Attorney, Agent, or Firm* — Oblon, Spivak, McClelland, Maier & Neustadt, L.L.P.

(57) ABSTRACT

A method of monitoring status of an energy reserve accumulator, connected to a fluid system, includes the following successive operations once the fluid system has stabilized for pressure: measuring a first time taken by the fluid system to progress from a predetermined first pressure to a predetermined second pressure, lower than the predetermined first pressure; measuring a second time taken by the system to progress from a predetermined third pressure, lower than the predetermined second pressure, to a predetermined fourth pressure, lower than the predetermined third pressure; and comparing the first and second times to determine the status of the energy reserve accumulator. Such a method may find use for example in an aircraft.

12 Claims, 2 Drawing Sheets

U.S. PATENT DOCUMENTS

| | | | | |
|---|---|---|---|---|
| 6,192,299 | B1 * | 2/2001 | Kubota et al. | 700/282 |
| 6,460,500 | B1 * | 10/2002 | Ooyama et al. | 123/179.3 |
| 7,430,492 | B2 * | 9/2008 | Nicolas et al. | 702/176 |
| 2002/0035832 | A1 * | 3/2002 | Nakamura et al. | 60/413 |
| 2002/0162381 | A1 * | 11/2002 | Suzuki et al. | 73/1.17 |
| 2006/0048988 | A1 * | 3/2006 | Dreibholz et al. | 180/213 |
| 2007/0118325 | A1 * | 5/2007 | Nicolas et al. | 702/138 |

OTHER PUBLICATIONS

Combined Chinese Office Action and Search Report issued Nov. 5, 2012 in Chinese Patent Application No. 200980114567.9 (with English-language translation).

* cited by examiner

METHOD FOR MONITORING THE STATUS OF AN ENERGY RESERVE ACCUMULATOR, PARTICULARLY FOR AN AIRCRAFT

The present invention relates to a method for monitoring the status of an energy reserve accumulator connected to a fluid system. The present invention also relates to a monitoring device adapted to implement the aforementioned method, as well as to an aircraft adapted to implement the aforementioned method.

BACKGROUND OF THE INVENTION

Airplanes generally are equipped with several hydraulic circuits, allowing activation of all the ancillary equipment of the airplane. Generally, each device controlled by a hydraulic circuit is installed on both a main hydraulic circuit and an auxiliary hydraulic circuit, independent and autonomous, for reasons of safety.

As described in the document FR 2 888 898, it is known to use on such a hydraulic system an energy reserve accumulator that makes it possible to release its hydraulic energy reserve to the controlled components, in order to maintain the pressure in the hydraulic circuit at a level close to the rated operating pressure of these components. This energy reserve accumulator is placed on the high-pressure hydraulic line of the fluid system, between a hydraulic power generator and the controlled components, remote from the hydraulic power generator. Such an accumulator makes it possible to absorb theoverpressures generated in the hydraulic circuit by the operation of the various controlled components, and in this way to prevent the structure and the equipment items of the airplane from being damaged during sudden pressure change in the lines.

In order to monitor the status of an energy reserve accumulator, the document FR 2 888 898 proposes a method for checking the status of pressurization of an energy accumulator. In principle, this monitoring method consists, after having pressurized the fluid system to an operating pressure, of measuring the time interval necessary for the fluid system to progress from a predetermined first pressure to a predetermined second pressure and in comparing this time interval with a predetermined reference time. The predetermined reference time is determined by using the monitoring method on a reference accumulator.

The monitoring method in FR 2 888 898, however, is ineffective in certain configurations of the hydraulic system. In fact, the speed with which the pressure of the fluid decreases in a fluid system depends on the voluminal capacity of this system. Thus, the greater the volume of fluid, the longer the pressure of the fluid system will take to drop. Furthermore, in a fluid system, there is an internal flow between the high-pressure part and the low-pressure part of the system. The lower the flow between the high-pressure part and the low-pressure part, the longer the pressure of the system will take to drop.

Thus, in an aircraft with low flow rate or with a large voluminal capacity of the fluid system, the time taken by the system to progress from a first predetermined pressure to a second predetermined pressure may be considerable because of the configuration of the hydraulic system itself, and thus is not directly representative of the operating status of the energy accumulator.

BRIEF SUMMARY OF THE INVENTION

The present invention has as a purpose to resolve the aforementioned drawbacks and to provide a method for status monitoring of an energy reserve accumulator, in order to check the operation of an energy accumulator independently of the configuration of the hydraulic system on which the energy accumulator is installed.

To this end, the present invention relates to a method for monitoring the status of an energy reserve accumulator connected to a fluid system, characterized in that the method comprises the following successive steps: pressurizing the fluid system; maintaining the fluid at an operating pressure for at least a predetermined time to stabilize the fluid system; stopping the pressurization of the fluid system; measuring a first time taken by the fluid system to progress from a first predetermined pressure to a second predetermined pressure lower than the first predetermined pressure; measuring a second time taken by the system to progress from a third predetermined pressure, lower than the second predetermined pressure, to a fourth predetermined pressure, lower than the third predetermined pressure; and comparing the first and second times in order to determine the status of the energy reserve accumulator.

Thus, by comparing two time-interval measurements on a curve of pressure decrease in the fluid system, the operating status of the energy accumulator connected to the fluid system can be deduced, without the characteristics (voluminal capacity, internal flow rate) of the hydraulic system.

In an embodiment of the present invention, allowing a comparison of the measured times, the difference between the first predetermined pressure and the second predetermined pressure is more or less equal to the difference between the third predetermined pressure and the fourth predetermined pressure. In practice, the second predetermined pressure is higher than the precharge pressure of the accumulator at a temperature more or less equal to 60° C. Furthermore, the third predetermined pressure is lower than the precharge pressure of the accumulator at a temperature more or less equal to 40° C.

The predetermined pressures used to monitor the operating status of the energy accumulator takes into account the precharge pressure of the accumulator, and the accumulator is able to provide energy to the fluid system as long as the pressure of the fluid system is higher than the precharge pressure.

A second aspect of the present invention relates to a device to monitor the status of an energy reserve accumulator connected to a high-pressure line of a fluid system, and the fluid system comprising at least one pump to pressurize the system, characterized in that the device includes: a unit to process in real time; at least one pressure detector to measure the pressure of the fluid in the high-pressure line, the detector to transmit to the processing unit a measurement signal representative of the pressure measured by the detector; and in that the processing unit includes electronic measuring means for measuring a first time separating a measurement of a first predetermined pressure and a measurement of a second predetermined pressure transmitted by the pressure detector, and a second time separating a measurement of a third predetermined pressure and a measurement of a fourth predetermined pressure transmitted by the pressure detector, and comparing means for comparing the first time and the second time to determine the status of the energy reserve accumulator.

This monitoring device has characteristics and advantages similar to those described above with reference to the method for monitoring the operating status of an energy reserve accumulator.

The present invention also relates to an aircraft comprising at least one energy reserve accumulator connected to a high-pressure line of a fluid system, characterized in that the aircraft comprises means adapted to implement the method in accordance with embodiments of the present invention.

Other features and advantages of the present invention also will become apparent in the description below.

BRIEF DESCRIPTION OF THE SEVERAL VIEWS OF THE DRAWINGS

In the attached drawings, provided by way of non-limitative examples.

DETAILED DESCRIPTION OF THE INVENTION

Figure 1:
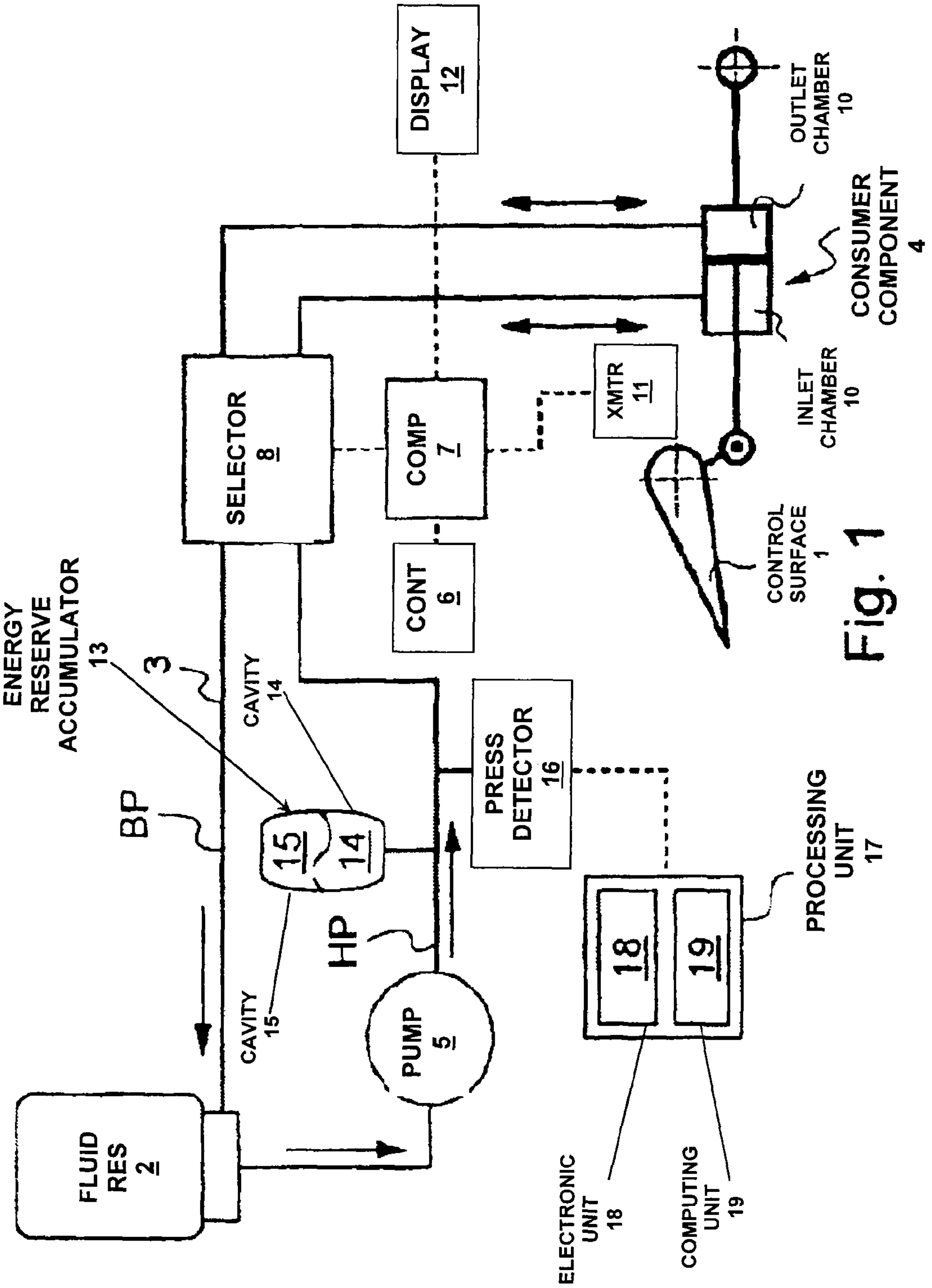
FIG. 1 is a schematic representation of a device for monitoring the status of an energy reserve accumulator according to one embodiment of the present invention.

FIG. 1 shows a device for monitoring the status of an energy reserve accumulator according to one embodiment of the present invention. The energy reserve accumulator is connected to a fluid system.

Here, the hydraulic circuit is adapted to control the operation of a control surface 1 of an aircraft. Each fluid system comprises its own fluid reservoir 2 connected to a closed fluid distribution circuit 3, which includes a high-pressure line HP and a low-pressure line BP for the return of low-pressure fluid to reservoir 2. The fluid used is an incompressible liquid for an airplane, but any other liquid, or air, may be used for applications other than aeronautical (land or naval).

In this embodiment, the fluid distribution circuit is connected to a hydraulic jack 4. Such a fluid distribution circuit 3 comprises rigid lines and possibly flexible lines for movable connections (brakes, landing gears, . . . ). The generation of hydraulic power is ensured, for example, by a variable-flow piston-pump 5.

When the pilot of the airplane acts on a control 6 such as a joy stick, a control signal is sent to a computer 7 that controls a selector 8. A face of jack 4 receives the hydraulic pressure in an inlet chamber 9, which brings about a movement of the jack (toward the right in FIG. 1). Control surface 1 then moves downward. Since outlet chamber 10 of this jack is connected in return to reservoir 2, the fluid present in this chamber 10 is sent to reservoir 2. A transmitter 11 sends a signal from control surface 1 to computer 7 for display 12. Of course, selector 8 may send the fluid under high pressure to chamber 9 or to chamber 10 according to the desired direction of movement of control surface 1, downward or upward.

In order to operate efficiently, the components consuming hydraulic power such as the jack described above need a constant rated pressure in chambers 9 or 10 according to the operation to be performed. As it happens, rapid operations cause the rated pressure to drop transitorily, because the hydraulic pumps are not able to ensure maintenance of this pressure, particularly if consumer components 4 are located far from this hydraulic power source. The fluid entering inlet chamber 9 must be under rated pressure in order to cause control surface 1 to move in optimal manner. The low-pressure fluid of outlet chamber 10 returns via a low-pressure line BP to reservoir 2. It is this pressure difference between inlet chamber 9 and outlet chamber 10 that activates control surface 1.

An energy reserve accumulator 13 that is adapted to release its hydraulic energy reserve to the consumer component or components 4 then is called upon in order to maintain the pressure at a level close to the rated operating pressure. This energy reserve accumulator 13 is placed on high-pressure hydraulic line HP between hydraulic power generator 5 and consumer components 4 farthest from this power generator 5.

This accumulator 13 also makes it possible to absorb the overpressures generated in the hydraulic circuit by the operation of consumer components 4. In this way, the structure and the equipment items of the airplane are prevented from being damaged during sudden pressure change in the lines.

Each fluid system comprises at least one energy reserve accumulator 13, their number depending on the demands of the ancillary equipment for fluid under rated pressure. A device of the present invention described below in the context of monitoring the status of an accumulator connected to a fluid system may be adapted by the individual skilled in the art to monitor all the accumulators of a fluid system.

Energy reserve accumulator 13 is a membrane accumulator comprised of an elastic wall delineating the inner space of this accumulator in two cavities 14, 15. In a variant, energy reserve accumulator 13 may be a hydraulic accumulator with metal bellows. Since proper operation of this energy reserve accumulator is ensured only when the accumulator is correctly pressurized, it is necessary to regularly check the status of accumulator 13.

The device comprises a pressure detector 16 to measure the pressure of the fluid in high-pressure line HP of the fluid system. The pressure detector 16 is installed on distribution circuit 3 on the same high-pressure line HP where energy reserve accumulator 13 to be tested is placed. The pressure detector 16 transmits a measurement signal representative of the pressure measured by the detector to a real-time processing unit 17. The pressure detector 16 advantageously makes it possible to measure pressures going up to 420 bars with a measuring accuracy under +/−2.5 bars. Pressure detector 16 must have an acquisition speed in order to be able to respond to discharge times well under one second.

Real-time processing unit 17 is, for example, an on-board computer. The real-time processing unit 17 comprises electronic measuring means 18 to measure a time interval $\Delta t$ separating two pressure measurements predetermined by pressure detector 16. The real-time processing unit 17 further comprises comparing means 19 to compare time intervals $\Delta t$ with each other. These means are used by software means known to the individual skilled in the art and will not be described here.

Monitoring the status of an accumulator 13 may be carried out in blind time each time the pump pressurizes the fluid system to rated pressure in stable manner, then stops. Status monitoring thus may be performed, for example, after a maintenance operation, keeping up the generation of power necessary for the test. The secondary power generation, however, must be capable of being cut off instantaneously. A hydraulic pump with an electric power source, for example, thus may be used.

The processing unit then starts, in preprogrammed manner, the method for status monitoring of an accumulator, such as described below. Real-time processing unit 17 may send a signal of status of energy reserve accumulator 13 to display means indicating to the operator whether a maintenance operation should be carried out on this accumulator 13.

Figure 2:
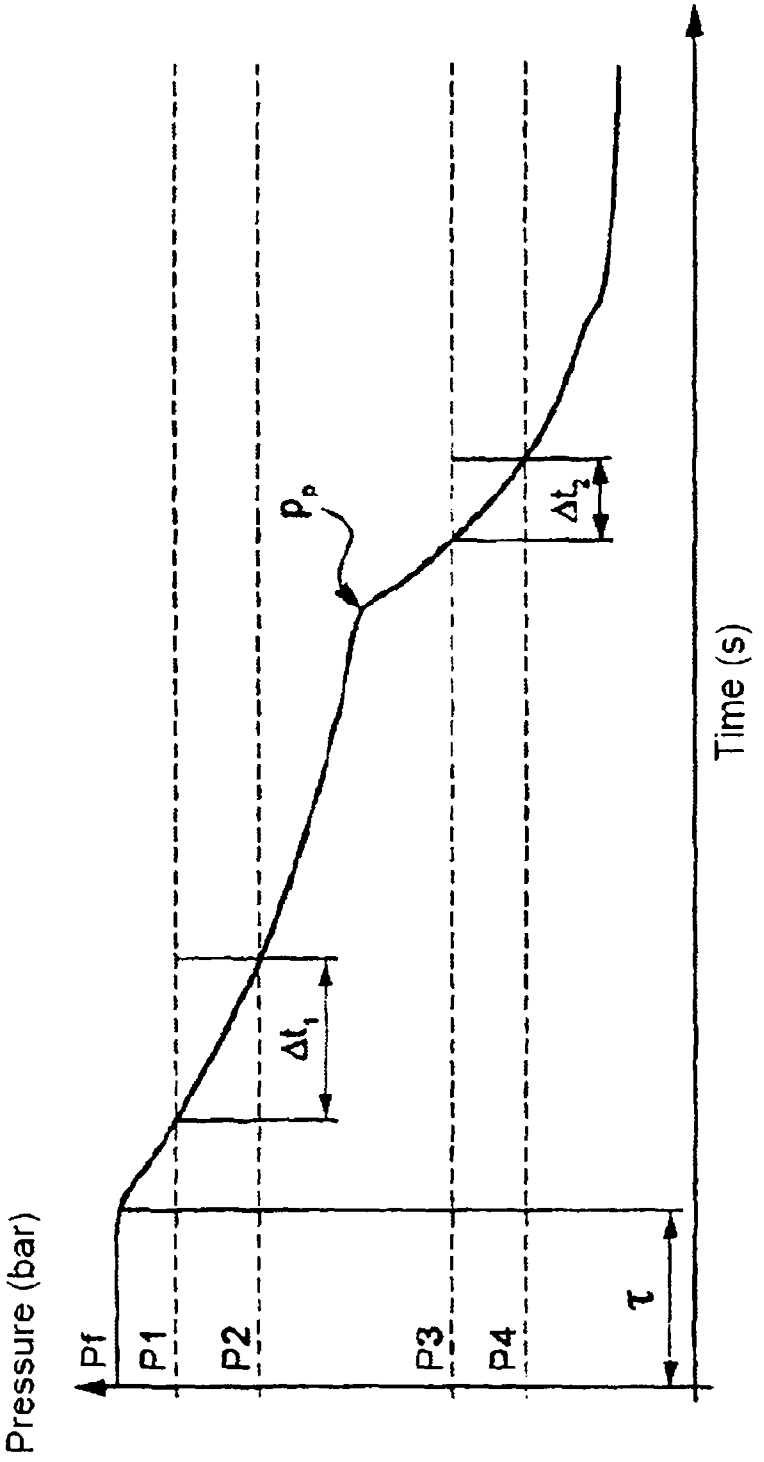
FIG. 2 is a curve illustrating the use of the method for monitoring the status of an energy reserve accumulator according to one embodiment of the present invention.

The method for monitoring the status of an energy reserve accumulator 13 installed on a fluid system such as described above now is going to be described with reference to FIG. 2.

First, the fluid system is pressurized using at least one pressurization pump 5 such as described above is used. The fluid is maintained at an operating pressure $P_F$, for example 210 bars, for at least a time $\tau$ to ensure stabilization of the fluid system. Stabilization of the fluid system is achieved when no further pressure change is seen in the fluid system.

Pressurization of the fluid system then is stopped, and the drop in pressure of the system is monitored. The gas pressure in the second cavity of energy reserve accumulator 13 then is deduced from analysis of pressure discharge time $\Delta t$ of the fluid system.

In principle, the monitoring method consists in measuring a first time $\Delta t_1$ taken by the fluid system to progress from a first pressure P1 to a second pressure P2, lower than first pressure P1, then a second time $\Delta t_2$ taken by the fluid system to progress from a third pressure P3, lower than second pressure P2, to a fourth pressure P4, itself lower than third pressure P3.

It will be noted that the first and second pressures are higher than a precharge pressure $P_P$ of accumulator 13, while the third and fourth pressures are lower than the precharge pressure of accumulator 13. This precharge pressure $P_P$ corresponds to the pressure of the gas in second cavity 15 of energy reserve accumulator 13 in its new state, that is to say the precharge pressure $P_P$ corresponds to the pressure such as specified on delivery from the factory. By way of example, the precharge pressure $P_P$ is typically 133 bars at 20° C. for a nitrogen-type gas. Thus, accumulator 13 may provide energy to the fluid system as long as the pressure of the fluid system is higher than the precharge pressure.

It will be noted in particular that this precharge pressure $P_P$ depends on the temperature at which accumulator 13 happens to be. In aeronautical applications, the method for monitoring the status of an accumulator should be used outside of extreme temperatures, of the −40° C. or +60° C. type.

The different predetermined pressures used by the monitoring method in accordance with the present invention thus may be determined according to the following criteria.

Second predetermined pressure P2 should be higher than the precharge pressure of accumulator 13 at a temperature more or less equal to 60° C.: P2>$P_{P+60° C.}$.

Likewise, third predetermined pressure P3 is lower than the precharge pressure of the accumulator at a temperature more or less equal to −40° C.: P3 $P_{P-40° C.}$. By way of non-limitative example, when $P_{P+20° C.}$ is approximately equal to 133 bars, the value of $P_{P-40° C.}$ is on the order of 106 bars and the value $P_{P+60° C.}$ is on the order of 152 bars.

First predetermined pressure P1 should be higher than second predetermined pressure P2 while remaining lower than operating pressure $P_F$ of the fluid system.

Finally, the difference between first predetermined pressure P1 and second predetermined pressure P2 is more or less equal to the difference between third predetermined pressure P3 and fourth predetermined pressure P4: (P1−P2)=(P3−P4).

In this way, the necessary time taken by the fluid system to drop by the same pressure variation, on both sides of precharge pressure $P_P$ of accumulator 13 at 20° C. is observed and measured.

In practice, if first time $\Delta t_1$ is greater than second time $\Delta t_2$, in a comparison step it is deduced therefrom that the accumulator is in an operational status, that is to say that the accumulator is releasing hydraulic energy to the fluid system between first pressure P1 and second pressure P2.

On the contrary, if first time $\Delta t_1$ is less than second time $\Delta t_2$, that means that the accumulator is not releasing any energy to the fluid system and thus the accumulator no longer is operational.

The processing unit 17 indicates to the operator the operational or non-operational status of the accumulator, in order to bring about a maintenance activity, if need be, when accumulator 13 no longer is operational.

By way of purely illustrative example, in an aircraft with a fluid system having a rated pressure of 206 bars, the values of predetermined pressures used in the method for monitoring the status of an accumulator may be the following:

P1=190 bars,

P2=160 bars,

P3=90 bars, and

P4=60 bars.

Of course, many modifications may be introduced in the exemplary implementation described above without departing from the context of the invention.

The invention claimed is:

1. A method of monitoring a status of an energy reserve accumulator connected to a fluid system, the method comprising:

pressurizing the fluid system;

maintaining a fluid at an operating pressure for at least a predetermined time to stabilize the fluid system;

stopping pressurization of the fluid system;

measuring a first time taken by the fluid system to progress from a first predetermined pressure to a second predetermined pressure, lower than the first predetermined pressure;

measuring a second time taken by the fluid system to progress from a third predetermined pressure, lower than the second predetermined pressure, to a fourth predetermined pressure, lower than the third predetermined pressure; and comparing the first and second times to determine the status of the energy reserve accumulator.

2. A monitoring method according to claim 1, wherein a difference between the first predetermined pressure and the second predetermined pressure is substantially equal to a difference between the third predetermined pressure and the fourth predetermined pressure.

3. A monitoring method according to claim 1, wherein the second predetermined pressure is higher than a precharge pressure of the energy reserve accumulator at a temperature substantially equal to 60° C.

4. A monitoring method according to claim 1, wherein the third predetermined pressure is lower than a precharge pressure of the energy reserve accumulator at a temperature substantially equal to −40° C.

5. A monitoring method according to claim 1, wherein in said comparing, the status of the energy reserve accumulator is operational when the first time is greater than the second time.

6. An aircraft comprising at least one energy reserve accumulator connected to a high-pressure line of a fluid system, the aircraft being configured to perform the method according to claim 1.

7. A device for monitoring a status of an energy reserve accumulator connected to a high-pressure line of a fluid system including at least one pump to pressurize the fluid system, the device comprising:

a real-time processing unit; and at least one pressure detector that measures pressure of a fluid in the high-pressure line, the at least one pressure detector being configured to transmit to the real-time processing unit a measurement signal representative of the pressure measured by the at least one pressure detector, wherein the real-time processing unit includes:

an electronic measuring unit to measure a first time separating a measurement of a first predetermined pressure and a measurement of a second predetermined pressure transmitted by the at least one pressure detector, and to measure a second time separating a measurement of a third predetermined pressure and a measurement of a fourth predetermined pressure transmitted by the at least one pressure detector, and a comparing unit to compare the first time and the second time to determine the status of the energy reserve accumulator.

8. A device according to claim 7, further comprising a display unit to display a signal associated with the status of the energy reserve accumulator sent by the real-time processing unit, wherein the status of the energy reserve accumulator is operational when the first time is greater than the second time.

9. A device according to claim 7, wherein the first and second predetermined pressures are higher than a precharge pressure of the energy reserve accumulator, and the third and fourth predetermined pressures are lower than the precharge pressure of the energy reserve accumulator, a difference between the first and second predetermined pressures being substantially equal to a difference between the third and fourth predetermined pressures.

10. A device according to claim 7, wherein the at least one pump, the real-time processing unit, and the at least one pressure detector pressurize the fluid system, maintain a fluid at an operating pressure for at least a predetermined time to stabilize the fluid system, and then stopping pressurization of the fluid system.

11. A device according to claim 7, wherein the second predetermined pressure is lower than the first predetermined pressure.

12. A device according to claim 7, wherein the third predetermined pressure is lower than the second predetermined pressure, and the fourth predetermined pressure is lower than the third predetermined pressure.

* * * * *